United States Patent
Esser (10) Patent No.: US 9,533,355 B2
(45) Date of Patent: Jan. 3, 2017

(54) MACHINE FOR MACHINING PIPE ENDS, HAVING A CENTERING DEVICE FOR CENTERING A TUBULAR WORKPIECE IN RELATION TO AN AXIS OF ROTATION

(71) Applicant: SMS MEER GMBH, Mönchengladbach (DE)

(72) Inventor: Karl-Josef Esser, Moenchengladbach (DE)

(73) Assignee: SMS MEER GMBH, Moenchengladbach (DE)

( * ) Notice: Subject to any disclaimer, the term of this patent is extended or adjusted under 35 U.S.C. 154(b) by 0 days.

(21) Appl. No.: 14/377,552

(22) PCT Filed: Jul. 31, 2013

(86) PCT No.: PCT/EP2013/066053
§ 371 (c)(1),
(2) Date: Aug. 23, 2014

(87) PCT Pub. No.: WO2014/020050
PCT Pub. Date: Feb. 6, 2014

(65) Prior Publication Data
US 2015/0321303 A1 Nov. 12, 2015

(30) Foreign Application Priority Data
Jul. 31, 2012 (DE) .......... 10 2012 015 222

(51) Int. Cl.
*B23B 31/12* (2006.01)
*B23Q 3/18* (2006.01)
(Continued)

(52) U.S. Cl.
CPC ............... *B23B 25/06* (2013.01); *B23B 5/08* (2013.01); *B23B 31/1269* (2013.01);
(Continued)

(58) Field of Classification Search
CPC .. B23B 31/1269; B23B 31/1261; B23B 5/165; B23B 5/08; B23B 25/06; B23B 31/12; B23B 5/161; B23Q 7/05; B23Q 1/76; B23Q 3/18; B23Q 3/064; B21B 25/02; B21C 1/34; F16B 2/10; F16B 2/12
(Continued)

(56) References Cited

U.S. PATENT DOCUMENTS 3,101,015 A * 8/1963 Schuetz ................. B21B 25/02
                                                     279/106
3,535,963 A * 10/1970 Dietl ....................... B23Q 1/76
                                                      82/162

(Continued)

FOREIGN PATENT DOCUMENTS

DE        1477302 A     3/1969
DE   102008023062 A    11/2009
(Continued)

*Primary Examiner* — Sunil K Singh
*Assistant Examiner* — Sara Addisu
(74) *Attorney, Agent, or Firm* — Andrew Wilford (57) ABSTRACT

The invention relates to a machine (1) for machining pipe ends. At least one centering device (8; 35) is associated to said machine, which centering device centers a tubular workpiece (5, 5') in relation to an axis of rotation (D) of the machine for machining pipe ends extending in the center of the machine, the tubular workpiece either being stationary in the case of a rotating tool head (4) or rotating in the case in which the tubular workpiece is fastened in the machine chuck (9). Precise centering of the tubular workpiece (5, 5') is quickly and simply achieved in that the centering device (8; 35) has a clamping housing (13; 130) that is open toward the axis of rotation (D), which clamping housing is designed comprising at least three means (14, 15, 16; 140, 150, 160) for contacting the tubular workpiece at the outer circumference and for clamping the tubular workpiece (5, 5') in a centered manner, which means are circumferentially distrib- (Continued)

uted and adjust mechanically independently of each other to the particular diameter of the workpiece (5, 5') to be machined.

8 Claims, 6 Drawing Sheets

(51) Int. Cl.
    *B23B 25/06*     (2006.01)
    *B23B 5/08*     (2006.01)
    *B23Q 1/76*     (2006.01)
    *F16B 2/10*     (2006.01)
    *B23Q 3/06*     (2006.01)

(52) U.S. Cl.
    CPC ............ *B23B 31/1276* (2013.01); *B23Q 1/76* (2013.01); *B23Q 3/183* (2013.01); *B23B 2270/12* (2013.01); *B23Q 3/064* (2013.01); *F16B 2/10* (2013.01); *Y10T 82/2597* (2015.01)

(58) Field of Classification Search
    USPC .................................. 82/113, 128, 70.2, 130
    See application file for complete search history.

(56) References Cited

U.S. PATENT DOCUMENTS

| | | | |
|---|---|---|---|
| 3,605,530 A | 9/1971 | Doty | |
| 4,228,939 A * | 10/1980 | Cattaneo | B21B 25/02 226/172 |
| 4,416,174 A * | 11/1983 | Owsen | B23Q 1/76 451/408 |
| 4,465,422 A * | 8/1984 | Blust, Sr. | B23Q 1/76 408/45 |
| 4,519,279 A * | 5/1985 | Ruggeri | B23Q 1/76 294/116 |
| 4,546,681 A * | 10/1985 | Owsen | B23Q 1/76 294/116 |
| 4,638,655 A * | 1/1987 | Sebastian | B21B 25/02 72/208 |
| 4,754,673 A * | 7/1988 | Hiestand | B23Q 1/76 82/162 |
| 4,967,579 A * | 11/1990 | Haydo | B21B 25/02 72/428 |
| 5,282,403 A * | 2/1994 | Rouleau | B23B 31/1269 82/127 |
| 6,439,087 B1 * | 8/2002 | Haas | B23B 31/1269 82/163 |
| 6,458,022 B1 * | 10/2002 | Folz | B23Q 1/76 269/196 |
| 7,241,086 B2 | 7/2007 | Esser | |
| 2002/0029668 A1 * | 3/2002 | Kroisandt | B23Q 1/0036 82/53 |
| 2009/0001643 A1 * | 1/2009 | Rehm | B23Q 1/76 269/55 |

FOREIGN PATENT DOCUMENTS

| | | |
|---|---|---|
| DE | 102009053678 A | 9/2010 |
| JP | 2001225206 A | 8/2001 |
| SU | 821148 A | 11/1979 |
| SU | 1283019 A | 7/1985 |

\* cited by examiner

MACHINE FOR MACHINING PIPE ENDS, HAVING A CENTERING DEVICE FOR CENTERING A TUBULAR WORKPIECE IN RELATION TO AN AXIS OF ROTATION

CROSS REFERENCE TO RELATED APPLICATIONS

This application is the US-national stage of PCT application PCT/EP2013/066053 filed 31 Jul. 2013 and claiming the priority of German patent application 102012015222.1 itself filed 31 Jul. 2012.

FIELD OF THE INVENTION

The invention relates to an apparatus for machining pipe ends having at least one device for centering on an axis at the center of the apparatus a tubular workpiece that is either rotating adjacent a stationary tool or stationary while the tool head orbits when gripped in the apparatus's chuck.

In the state of the art, pipe-end machining machines or apparatuses are known that machine tubular workpieces. For this purpose, a machine spindle can be a hollow cylinder through which the pipe is pushed to the machining region of the pipe-end machining apparatus. There is a clamp on the apparatus that must grip and hold the tubular workpiece before the chip-removing machining process can take place.

The tubular workpiece can then be machined on its outer and inner surface at its ends, i.e. the pipe end is subjected to chip-removing machining. This can be understood, in general, to mean any desired bevels and also, in particular, the cutting of internal and external screwthreads as well as chamfers.

Machining takes place, for example, by engaging tools with the tubular workpiece, where multiple tools can be held by an indexing head. In this connection, it is possible in general that the tubular workpiece rotates and the tools are stationary; likewise, the tools can orbit and machine a stationary tubular workpiece. With regard to the state of the art, reference is made to DE 10 2004 004 498 [U.S. Pat. No. 7,241,086].

The set up movements between the tubular workpiece and the tools are controlled numerically in this connection as is known. For this purpose, it is necessary that in the case of a tubular workpiece that is stationary during the chip-removing machining, this workpiece is first brought into a defined position relative to the apparatus before the tool advance is activated and machining of the pipe end by the orbiting tool can take place. This applies analogously if the tubular workpiece is rotated and the tool does not orbit but is moved toward the pipe.

It is problematic, in this connection, that centering of the tubular workpiece is sometimes difficult. Position deviations from the center of rotation, i.e. from the axis or the center of the machining apparatus, bring about corresponding production inaccuracies and unsatisfactory results.

In order to counteract these disadvantages, a centering device that can be temporarily connected with the chuck of the pipe-end machining apparatus by support and guide shoes and that supports itself against these has become known from DE 10 2009 053 678. This device preferably has two centering or guide rods that run parallel spaced from one another in a spectacle-like housing. The rods move in respective support and guide shoes during movement of the centering device toward the chuck in accordance with the displacement path, and position the centering device precisely relative to the center of rotation or center axis, and thereby concentric to the pipe to be clamped.

However, connection or coupling to and release or uncoupling of the centering device from the chuck requires an increased expenditure of time, thereby making the cycle time during the machining process for each individual tubular workpiece undesirably longer.

OBJECT OF THE INVENTION

The object of invention is therefore to create a pipe-end machining apparatus of the above-described type in which precise centering of the tubular workpiece is possible in a rapid and simple manner so the workpiece can then be precisely clamped in the pipe-end machining apparatus in a centered and equalized manner.

SUMMARY OF THE INVENTION

This object is attained according to the invention in that the centering device has a body that is open toward the axis and that is provided with at least three angularly spaced and mechanically coupled centering jaws for synchronously contacting an outer surface of the workpiece to be machined and thereby effecting centering of the tubular workpiece to be machined.

For machining a workpiece that is stationary and fixed in place, a centering device is provided according to the invention for centering the workpiece where it will be threaded, i.e. directly adjacent the rotating tool head, the body of this device being on the open side of a pivot arm so it can be pivoted toward or away from the axis of the pipe-end machining apparatus by this pivot arm. For centered, precisely positioned clamping of the tubular workpiece in a clamp the workpiece handler for example can have multiple chucks or the like axially spaced from one another, depending on the length of the conveyed workpiece, the pivot arm with the actuating body and the jaws that are in the spread position, being pivoted under or over the tubular workpiece that is fixed in the pipe-end machining apparatus, with the centering jaws being spread to start with.

Subsequently, the centering jaws are jointly radially closed or moved toward one another by rocking the actuating body so that the tubular workpiece is centered precisely relative to the center of rotation or the center axis of the pipe-end machining apparatus, where the centering jaws are coupled in movement-dependent manner relative to one another and are set against the workpiece at the same angle.

When, afterward, the chucks of the machine clamp have grasped the pipe for subsequent, chip-removing machining, i.e. clamped in an equalizing manner and with precise centered pipe positioning, by the clamp of the actuating body, the centering jaws of the centering device are radially spread to the open position by moving the actuating body opposite to the centering process; the pivot arm, with the actuating body, can then be pivoted out of the machining region of the apparatus within a short time, with the jaws already spread, preferably by a piston/cylinder unit, and thereby frees this region for machining or for thread cutting with a rotating tool head.

The centering jaws for centering of the tubular workpiece at rest are carried according to the invention on respective as gripper-like levers, with contact faces provided on the inner surfaces of their ends that are free on the open side.

In contrast, the centering jaws for centering and for coaxial support of a rotating tubular workpiece are carried on levers and formed by freely rotating centering rollers provided on their ends that are free on the open side. In this connection, the actuating body is a roller centering device, according to an advantageous suggestion of the invention, and disposed on a locally fixed base frame, so as to pivot. The number of roller centering devices that is used here, axially spaced from one another, also depends on the length of the pipe to be machined.

For setting, i.e. loosening or clamping, or closing and spreading the levers, mechanically dependent on one another, a preferred embodiment of the invention provides for three levers forming a mechanical coupling disposed, on the one hand, on first and second housing-fixed rotation axles that are on the pivot arm or on the base frame, with two levers mounted on the first rotation axle and connected with the actuating body to pivot by bearings.

The pivot arm equipped with the actuating body and with the piston/cylinder unit provided for rocking of the actuating body can in turn be pivoted by a piston/cylinder unit that is pivoted on the frame of the pipe-end machining apparatus. Furthermore, according to the invention, an adjustable stop for positioning the actuating body relative to the axis or the apparatus center of the pipe-end machining apparatus is provided on the pivot arm. Control of the pivot arm and its position detection is implemented in the control of the pipe-end machining apparatus that is preferably a numeric control.

The three levers that can thereby be equated with mechanical coupling elements and form a gripper. When the actuating body cylinder is activated for centering, the levers are set radially against the tubular workpiece by the two rotation axles of the pivot arm, where the levers move angularly synchronously about the two rotation axles. In this connection, a parallelogrammatic linkage that is formed by the lever mounted only on the housing-fixed, second rotation axle and one (the lower one) of the two levers mounted on the first housing-fixed rotation axle generates synchronous movements and equiangular movement of these levers. By the guide function of the parallelogram, the same but opposite angle change of the other (upper) lever of the two levers mounted in the first housing-fixed rotation axle takes place. The gripper closes for precise centering of the pipe at the apparatus center axis.

The mechanical coupling with the parallelogram guide function ensures that when the piston rod of the cylinder is moved out, pivoting of the actuating body brings about a rotation of the levers about the rotation axles of the pivot arm toward the tubular workpiece, and when the piston rod is moved in, the opposite pivoting of the actuating body brings about rotation of the levers away from the tubular workpiece.

By a precise geometrical design of the mechanical coupling with corresponding radii and angle arrangements of the levers about the two housing-fixed rotation axles of the pivot arm, the tubular workpiece is positioned on center, independent of the pipe diameter, with great precision relative to the axis of the pipe-end machining apparatus, at all times.

BRIEF DESCRIPTION OF THE DRAWING

Further details and characteristics of the invention are evident from the claims and from the following description of illustrated embodiments of the invention shown in the drawings. Therein:

SPECIFIC DESCRIPTION OF THE INVENTION

Figure 1:
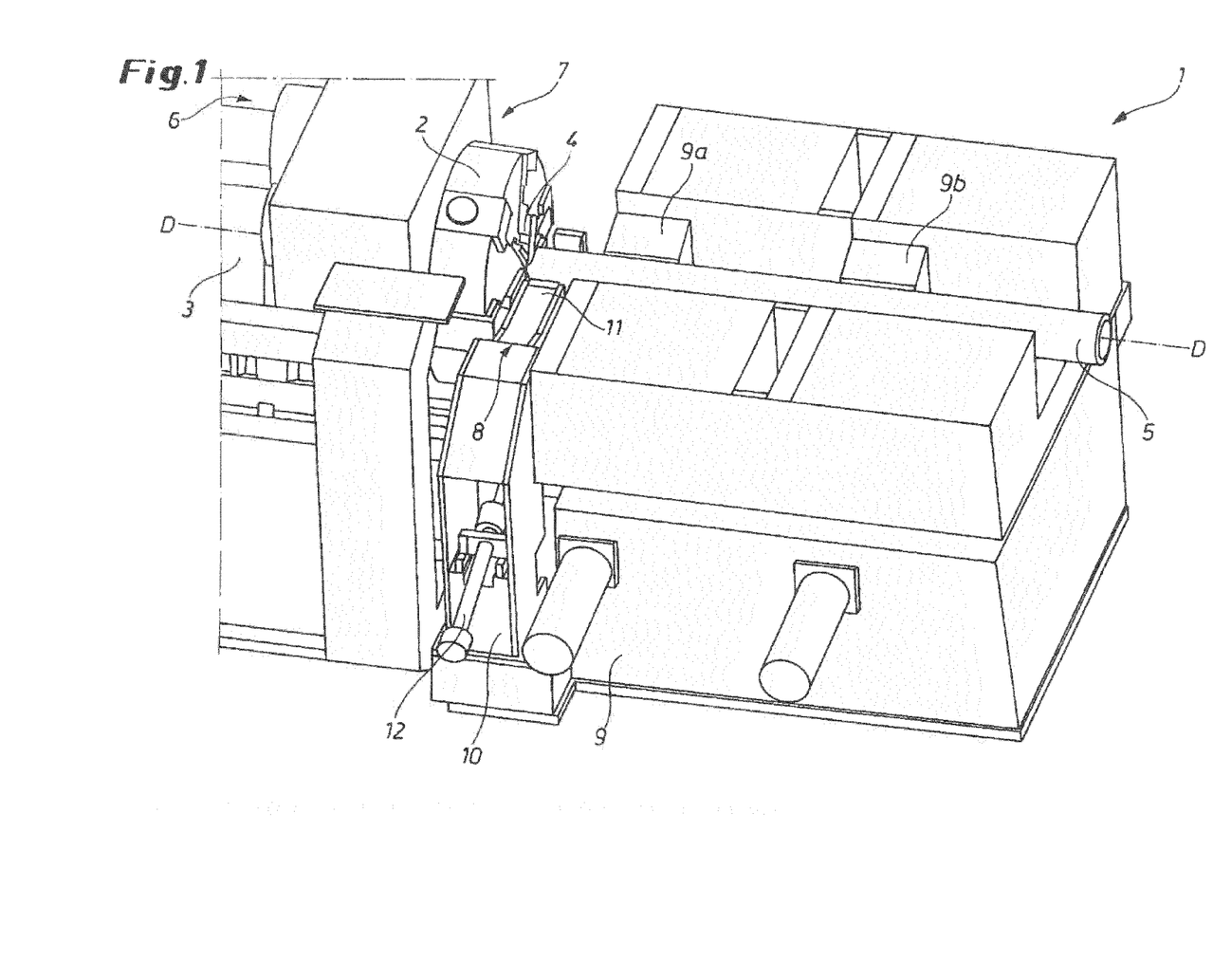
FIG. 1 is a perspective view of a detail of a pipe-end machining apparatus for a tubular workpiece showing the front machine region with rotating tool head and the pivotal centering device that is between this head and the workpiece clamp.

FIG. 1 shows an apparatus 1 for machining pipe ends that has a hollow main spindle 3 and a tool head 2 equipped with chip-removing machining tools 4, the spindle 3 and tool head 4 rotating about an axis D centered in the apparatus. An unillustrated drive is provided in a rear machine region 6 and a centering device 8 forward thereof and a clamp 9 further forward from the tool head 2 in a front machine region 7. The latter unit has multiple chucks 9a and 9b or the like, depending on the length of the workpiece 5.

The centering device 8 comprises a portal-like stand 10 in which is mounted a pivot arm 11. The pivot arm 11 is connected with the portal-like stand 10 by a movably mounted piston/cylinder unit 12 for pivoting toward and away from the axis D about a rotation axis 11' at the projecting end of the stand 10 (see FIGS. 3 and 4).

The pivot arm 11 carries an actuating body 13 associated with three levers 14, 15, and 16 whose free ends 17 carry jaws 18 for engaging the outer surface of the tubular workpiece 5.

The three levers 14, 15, and 16 are coupled by bearings 19 to the actuating body 13, two of the levers 14, 16 are mounted on a common axle 20, and the third lever 15 is mounted on a further axle 21 of the pivot arm 11. The axles 20, 21 can be formed by pins held in bores of the pivot arm 11.

The actuating body 13 with the levers 14, 15, and 16 that form a three-lever gripper 22 can be rocked in the pivot arm 11 according to the arrow 25 (see FIGS. 5 and 6), by a piston rod 23 of a cylinder 24 anchored on the pivot arm 11.

The pivot arm 11 thus carries by its axles 20 and 21 the actuating body 13 with the three-lever gripper 22 for centering the tubular workpiece 5 by means of the centering device 8 before the workpiece 5 is gripped by the clamp 9 to lock it in place.

When the piston rod 23 of the cylinder 24 is moved out to move the actuating body 13, the levers 14, 15, and 16 that are mechanically connected with one another for synchronous movement are all pivoted about the rotation axles 20, 21 of the pivot arm 11.

Specifically, a coupling 26 is thus formed for rocking of the pivoting actuating body 13 and the levers 14, 15, and 16 that are connected with it relative to the stationary pivot arm 11.

By the geometrical design of the coupling 26 with the radii R0, R1, and R2, and the angles of the levers 14, 15, and 16 about the two housing-fixed rotation axles 20, 21, not only a tubular workpiece 5 having a large diameter (see FIG. 5) but also a tubular workpiece 5' having a smaller diameter (see FIG. 6) can be centrally centered with great precision, in connection with the movement initiated by the piston rod 23 and the actuating body 13.

Figure 5:
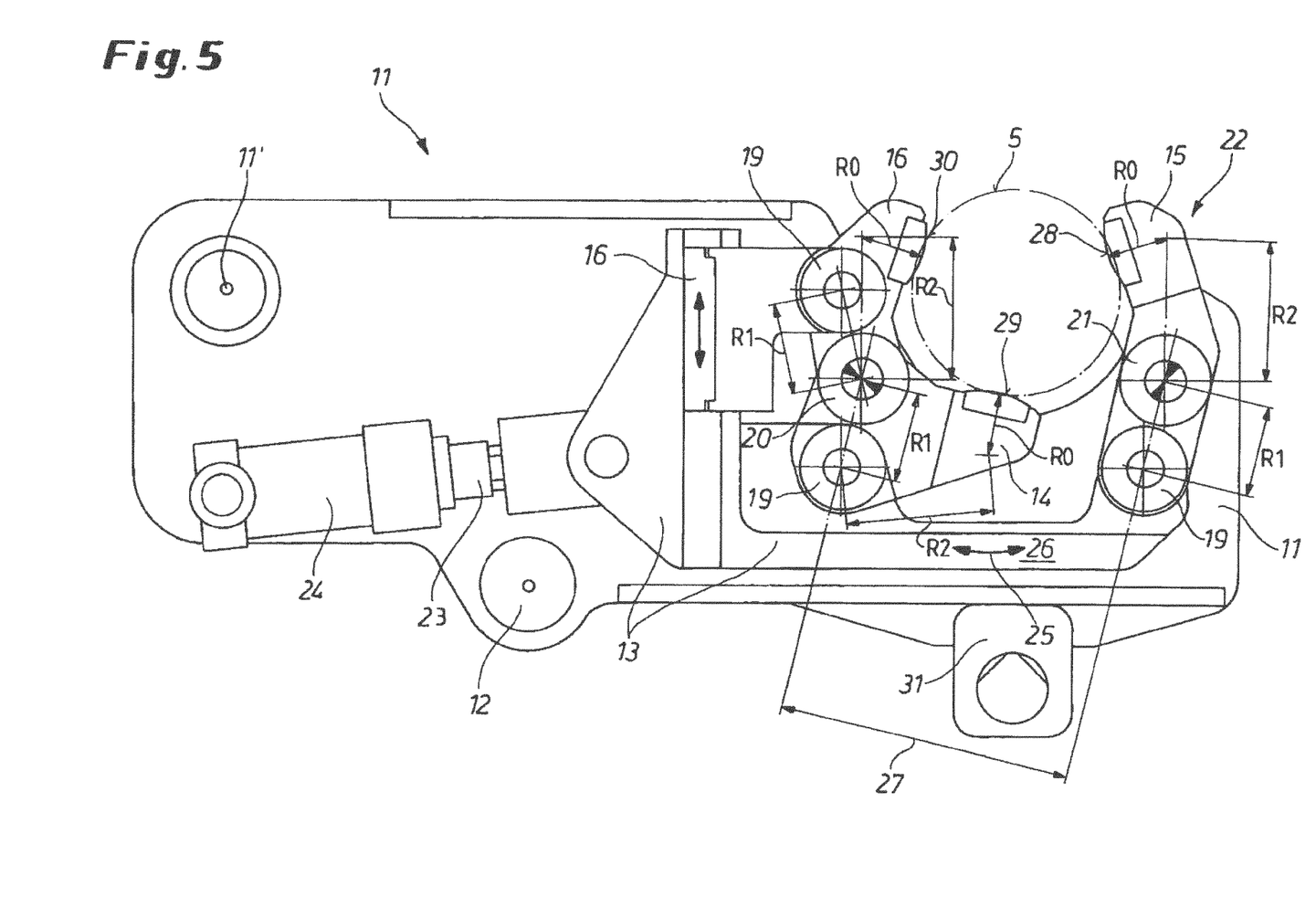
FIG. 5 is a detail view of the pivot arm of the centering device with levers set to a maximal diameter of the pipe to be centered.
Figure 6:
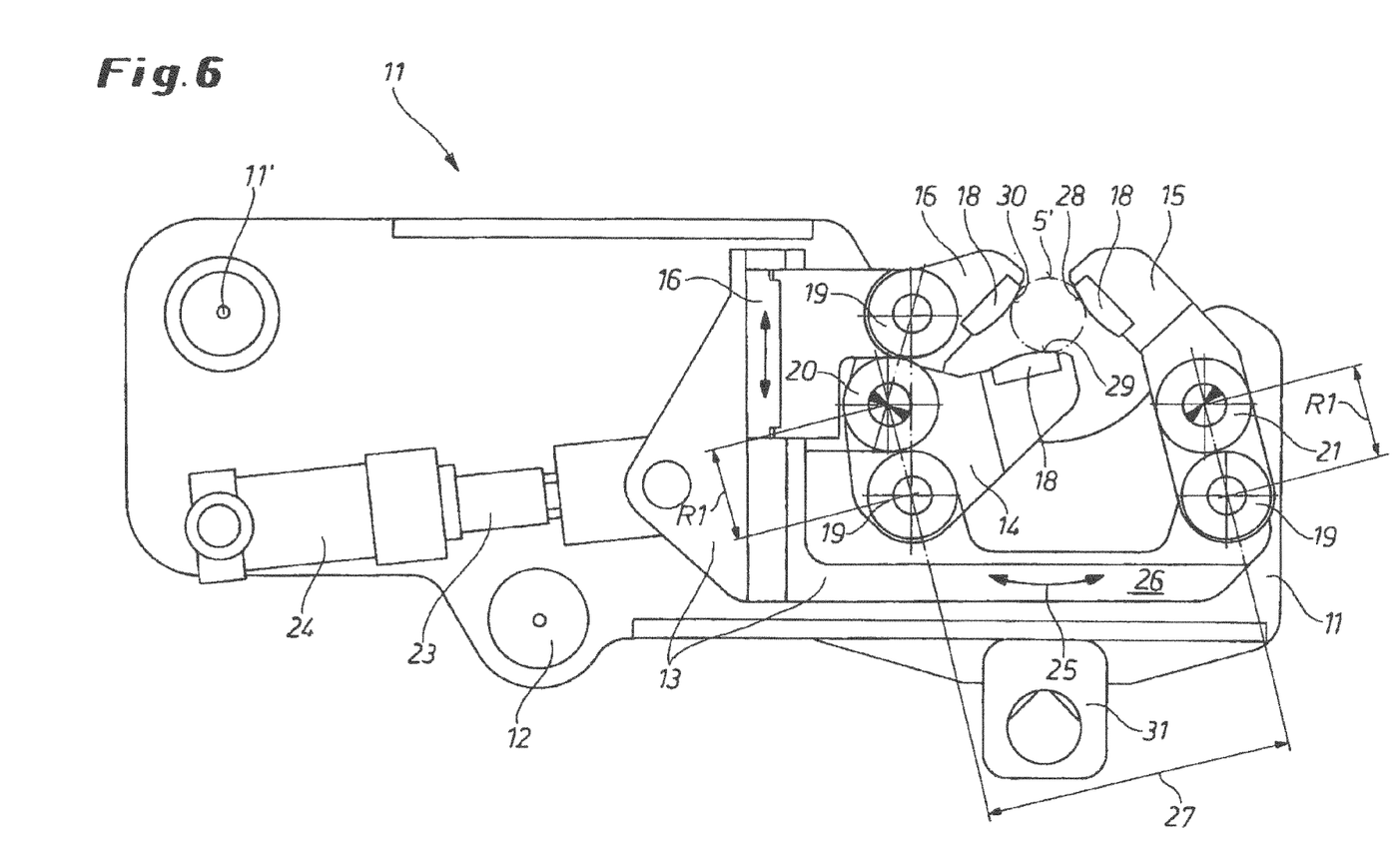
FIG. 6 is a detail view of the pivot arm of the centering device with levers set to a minimal diameter of the pipe to be centered.

Rotation of the levers 14, 15, and 16 effects the same precise angle change of the levers 14, 15, and 16 about the rotation axles 20, 21. This is achieved by a parallelogrammatic linkage 27 that generates synchronous movements and the same angular movements about the rotation axles 20 and 21 with their levers 14 and 15 for their centering locations 28, 29 on the outer surface of the tubular workpiece 5. The guide function of the parallelogram 27 ensures the same angular displacement of the lever 16 takes place for its centering location 30, in the opposite direction, about the rotation axle 20. For the upper lever 16 of the two levers 14, 16 provided on the common housing-fixed rotation axle 20 in the illustrated embodiment, a degree of freedom of movement can be made possible here by a configuration as a simple slide as is indicated in FIGS. 5 and 6 by a double arrow.

Figure 2:
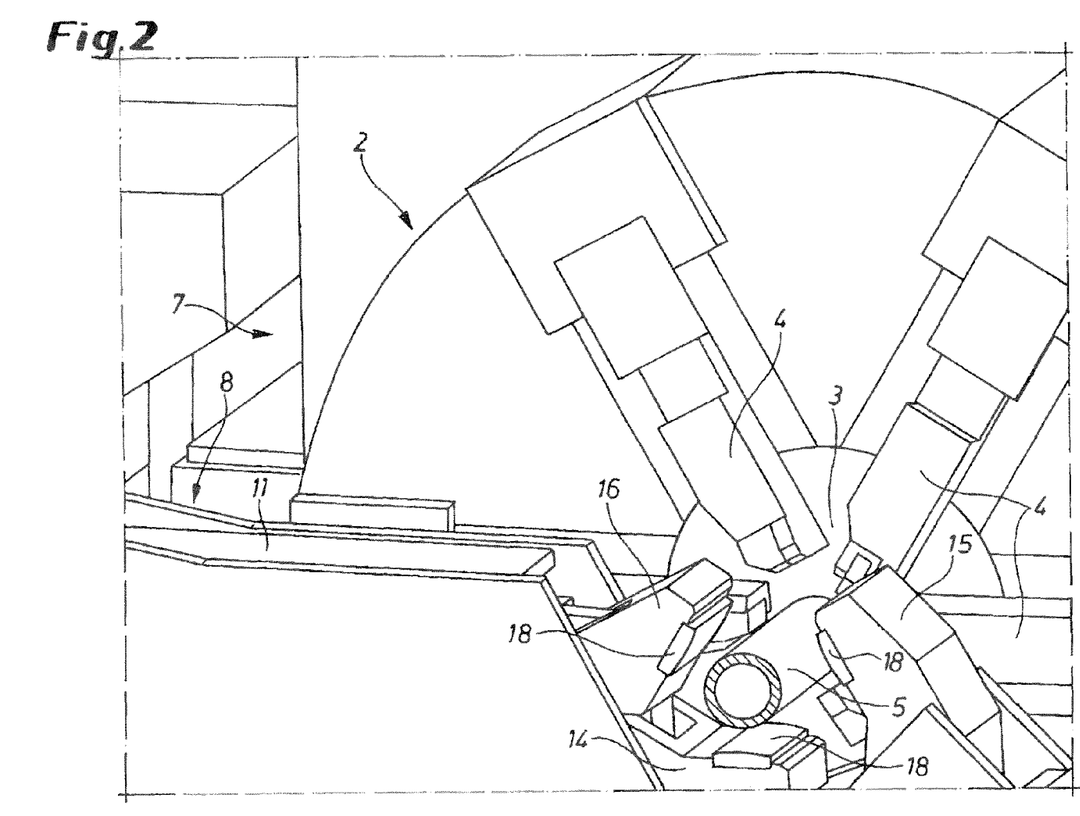
FIG. 2 is a perspective detail view of FIG. 1 showing the tool head with the machining tools and the levers carried on a pivot arm of the centering device in gripper-like manner for centering of the tubular workpiece.

In the apparatus 1 for machining pipe ends shown in FIG. 1, the chip-removing machining tools 4 orbit and machine the stationary tubular workpiece 5. For preparation of this machining process, after the tubular workpiece 5 has been fed into the apparatus 1 for machining pipe ends, the pivot arm 11 of the centering device 8 is pivoted toward the axis D by the piston/cylinder unit 12, where the spread levers 14, 15, and 16 spacedly surround the tubular workpiece 5 (see FIG. 2).

The actuating body 13 can be positioned precisely centered relative to the axis D or the center axis of the apparatus 1 for machining pipe ends, by an adjustable stop 31 provided on the pivot arm 11, using the pivot arms 14, 15, and 16 that form the gripper 22.

Subsequently, the actuating body 13 is rocked to the right in the direction of the pivot arrow 25 by the cylinder 24 and the piston rod 23, and thereby the coupling 26 then initiates rotation via the parallelogram linkage 27 of the radii R1—as explained above—using the levers 14, 15, and 16, and the tubular workpiece 5 is centered by the centering locations 28, 29, 30 of the jaws 18 of the levers 14, 15, and 16.

Afterward, fixing of the tubular workpiece 5 takes place by the clamp 9 of the apparatus 1 for machining pipe ends, and the pipe positioning previously undertaken by the gripper 22 of the centering device 8 is precisely taken over.

Figure 3:
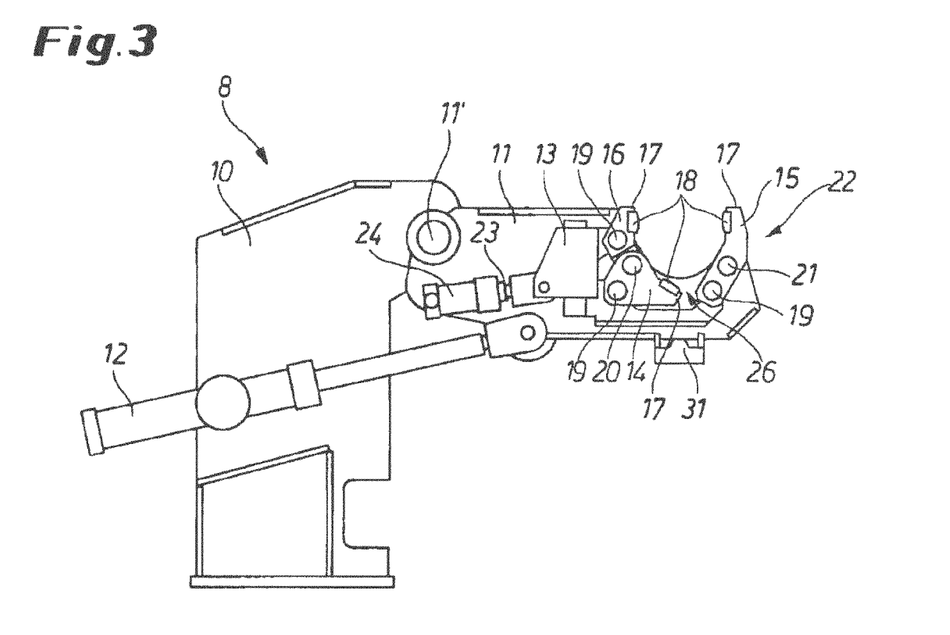
FIG. 3 is a detail view of the centering device showing the pivot arm with the gripper levers on an actuating body pivoted into the machining line of the pipe-end machining apparatus.

By reverse movement of the piston rod 23 and the related, opposite pivoting of the actuating body 13, spreading of the levers 14, 15, and 16 now takes place by the simultaneously initiated rotational rocking of the coupling 26, all the way to the starting position (see FIG. 3).

Figure 4:
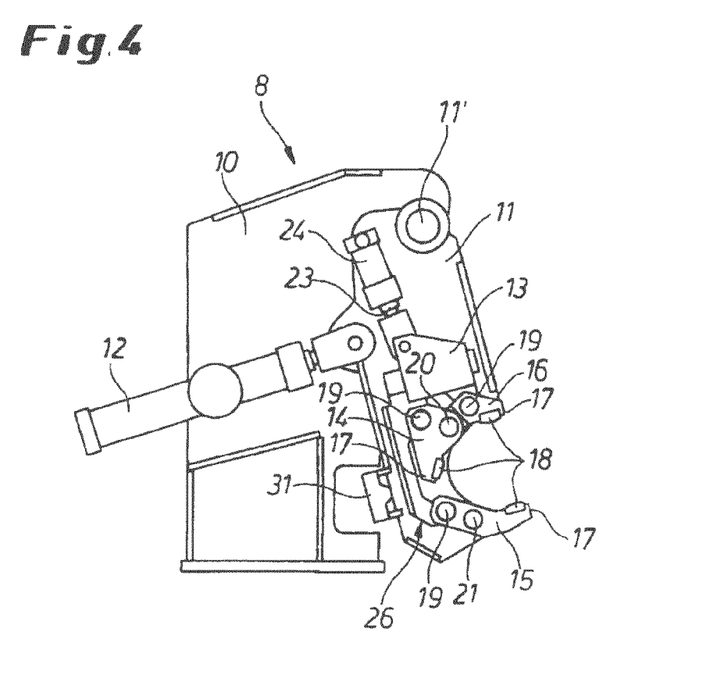
FIG. 4 is a detail view of the centering device showing the pivot arm with the gripper levers on an actuating body pivoted out of the machining line of the pipe-end machining apparatus.

The pivot arm 11 of the centering device 8 is subsequently pivoted from the axis D into its out-of-operation position shown in FIG. 4, by the piston/cylinder unit 12, and thereby machining of the tubular workpiece 5 by the then orbiting, chip-removing machining tools 4 can take place.

Figure 7:
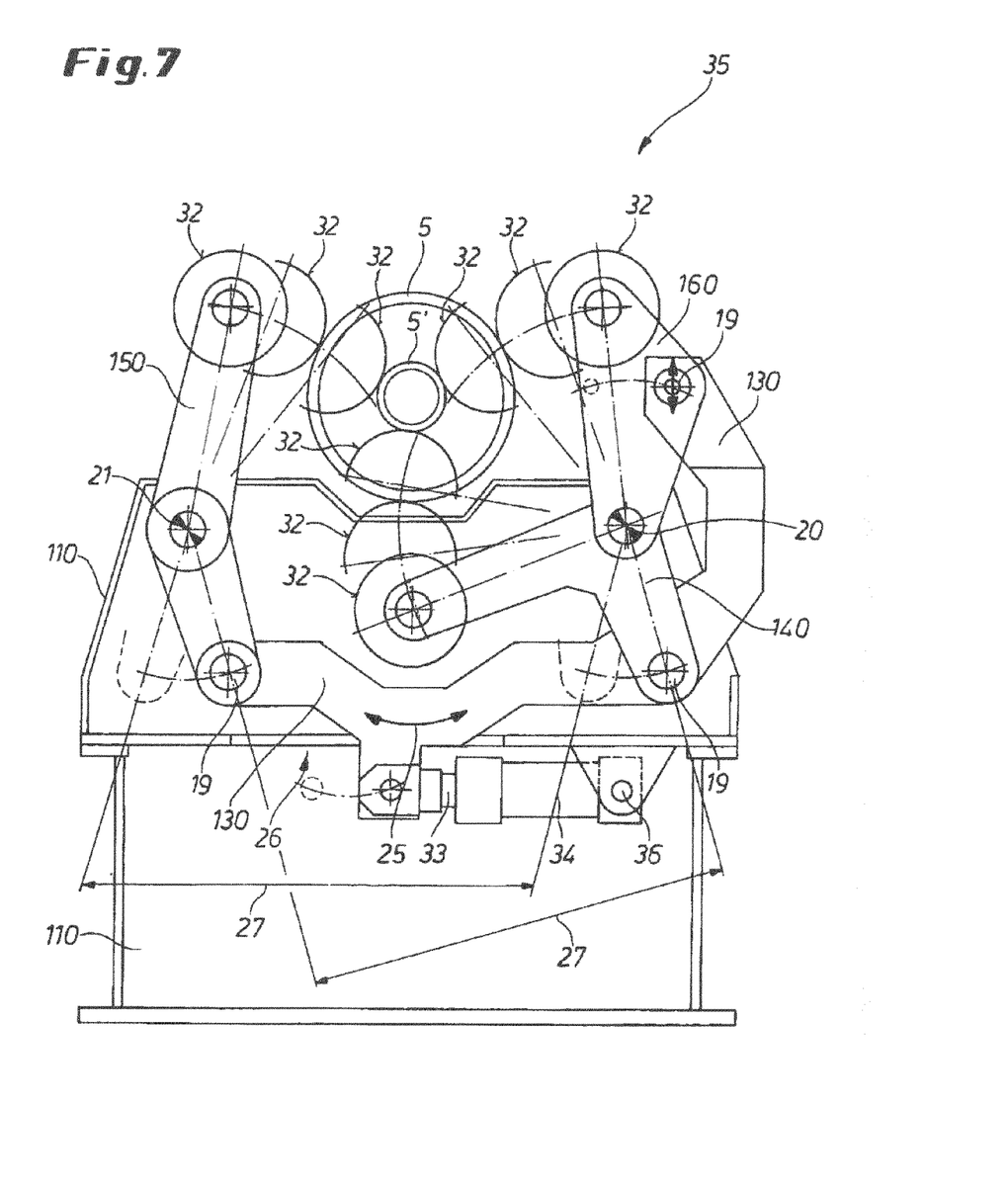
FIG. 7 is a schematic detail view of a centering device that is used upstream or downstream of an unillustrated pipe-end machining apparatus for coaxial guidance during machining of a rotating pipe, having a pivoting actuating body having three levers and formed as an L-shaped support frame in a locally fixed base frame, where the levers, provided with rollers, are shown in different positions.

In FIG. 7, an actuating body 130 forming part of a roller centering device 35 for concentrically guiding the tubular workpiece 5, 5' is shown for machining a workpiece 5, 5' that rotates while the tools are stationary. The actuating body 130 is approximately L-shaped here and can pivot as shown by arrow 25 in a locally fixed base frame 110; multiple such roller centering devices 35 are provided at an axial spacing from one another, depending on the length of the tubular workpiece 5, 5'.

The actuating body 130 also has three levers 140, 150, 160 acting as links. These in turn are pivoted in the actuating body 130 at bearings 19, on the one hand, and on the other hand, the two levers 140 and 160 are mounted on a common, housing-fixed axle 20, and the lever 150 is independently mounted on a further housing-fixed axle 21 of the locally fixed base frame 110.

The levers 140, 150, 160 are provided with freely rotating centering rollers 32 at their free ends.

The principle of action of the straight-line movement of the actuating body 130 by operation of a piston rod 33 of a cylinder 34 provided with a pivot 36 on the locally fixed base frame 110 and pivoted on the actuating body 130 with its piston rod 33, and of the straight-line movement of the lever 140, 150, 160 with the parallelogram linkage 27, is identical to the movement sequence described above for the centering device 8 having the levers 14, 15, and 16 and the a mechanical coupling 26 there.

The tubular workpiece 5 is precisely centered relative to the axis D by the centering rollers 32 before the actual machining takes place. The different angular positions of the centering rollers 32 shown schematically in FIG. 7 show a centering procedure of a large to a small diameter of the tubular workpiece 5 or 5'. The bearings 19 that move with the parallelogram linkage 27 are indicated by a broken line and a dot-dash line as the actuating body 130 is pivoted to center a workpiece 5' having a small pipe diameter, where the bearing 19 of the upper lever 160 in the illustrated embodiment of the two levers 140, 160 that can be jointly adjusted about the housing-fixed rotation axle 20 is given a degree of freedom of movement schematically shown as a double arrow, for example is structured as a slide or as a sliding block provided in an oblong hole.

During the subsequent chip-removing machining of the rotating tubular workpiece 5, precise concentric guidance, centered with reference to the axis D, is provided for the tubular workpiece 5 or 5'.

The invention claimed is:

1. An apparatus for machining pipe ends with at least one centering device for centering on a machining axis extending through the center of the apparatus a tubular workpiece that is either rotated adjacent a stationary tool or is stationary while the tool head orbits when gripped in a machine chuck, wherein the centering device has a body that is laterally open toward the axis and that is provided with at least three angularly spaced and mechanically coupled centering jaws radially displaceable between inner and outer positions for synchronously contacting an outer surface of the workpiece to be machined and thereby centering the tubular workpiece to be machined; and an actuating body is carried on a pivot arm that can pivot about an axis parallel to and offset radially from the machining axis for movement of an open side of the actuating body toward or away from the machining axis of the pipe-end machining apparatus between a centering position with the jaws surrounding the axis and an out-of-use position with the jaws spaced radially outward to one side of the axis.

2. The pipe-end machining apparatus according to claim 1, wherein the centering jaws are carried on inner ends of respective levers that are free on the open side.

3. The pipe-end machining apparatus according to claim 1, further comprising:
three mechanically coupled levers carrying the jaws and pivotal on first and second housing-fixed rotation axles of the pivot arm or of a base frame, two of the levers being mounted on the first rotation axle and being pivotally connected by bearings with the actuating body.

4. The pipe-end machining apparatus according to claim 1 wherein the actuating body can be moved on the pivot arm by a piston rod of a cylinder disposed on the pivot arm or on a base frame.

5. The pipe-end machining apparatus according to claim 1, wherein the pivot arm, including the actuating body, can be pivoted in and out by a piston/cylinder unit.

6. The pipe-end machining apparatus according to claim 1, further comprising:
an adjustable stop for positioning the actuating body with reference to the axis of the pipe-end machining apparatus on the pivot arm.

7. An apparatus for machining ends of a tubular workpiece, the apparatus comprising:
at least one tool movable radially of a machining axis;
clamp means for holding the tubular workpiece with an axis of the workpiece coaxial with the machining axis;
means for rotating the workpiece about the machining axis while moving the tool only radially of the machining axis or for holding the workpiece stationary while orbiting the tool about the machining axis and moving the tool radially of the machining axis to machine an end of the workpiece;
an arm pivotal about an arm axis parallel to and offset from the machining axis and having an open outer end;
means for pivoting the arm about the arm axis between a centering position with the open outer end surrounding the machining axis and an out-of-use position with the outer end spaced from the machining axis;
two pivot axles fixed on the arm, extending parallel to the machining and arm axes, and radially equispaced from the machining axis in the centering position;
first, second, and third levers having respective outer ends, the first and second levers being pivoted on one of the pivot axles and the third lever being pivoted on the other pivot axle;
a body coupled to all of the levers at pivot axes radially equispaced from the respective axles; and
actuating means connected between the body and the pivot arm for, in the centering position, shifting the body between inner and outer positions on the pivot arm and thereby shifting the jaws synchronously radially of the machining axis between closely juxtaposed inner positions all radially equispaced from the machining axis and less closely juxtaposed outer positions also radially equispaced from the machining axis, whereby movement of the jaws between the respective outer positions into the respective inner position in the centering position of the arm can center a workpiece between the jaws on the machining axis.

8. The combination defined in claim 7, further comprising:
an abutment on the apparatus engaging and arresting the pivot arm in the machining position with the jaws angularly equispaced around and radially equispaced from the machining axis.

* * * * *